Patented Nov. 16, 1937

2,099,104

UNITED STATES PATENT OFFICE 2,099,104

PRINTING AND DYEING COMPOSITIONS

Miles Augustinus Dahlen, Wilmington, and Frithjof Zwilgmeyer, Arden, Del., assignors to E. I. du Pont de Nemours & Company, Wilmington, Del., a corporation of Delaware No Drawing. Application October 10, 1935, Serial No. 44,328

10 Claims. (Cl. 8—5)

A. This invention relates to new compositions of matter and to methods of dyeing by the one-bath process. More particularly the invention relates to dyeing by printing, and to new compositions of matter useful in that process. The invention will be described with reference to particular examples which are illustrative, but not limitative, thereof.

B. The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized, and is reacted with the second component, usually in solution.

C. The azo dyes of the prior art are applied by one of several processes that have been devised to take advantage of the nature of particular dyes: (a) The dyestuff is dissolved or dispersed in a suitable liquid medium and the material to be dyed is dipped therein. Satisfactory results are obtained by this method only if the completed dyestuff is substantive to the material which is to be dyed. (b) A substantive coupling component, or a substantive azo component, is directly affixed to the material and the diazotized component or the coupling component, respectively, is coupled thereto, completing the dye on the material. (c) An azo component is diazotized and coupled to a compound with which it forms a new compound stable in alkaline or neutral medium, and is mixed with the coupling component and with the other ingredients of a basic or neutral printing paste, or solution. The material to be dyed is impregnated with the paste, or with the solution, by printing or in any other satisfactory manner and the dye is formed on the material by reaction with an acid, whereby it is freed and enabled to react with the coupling component. This invention relates to new compositions of matter to be applied by the third of these methods and to processes of applying them.

D. It is an object of the invention to prepare new compositions of matter suitable for the printing of textile fibers and other dyeable material. Another object of the invention is to prepare mixtures of stable, water-soluble, aryl diazoimino compounds and compounds represented by the formula

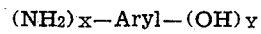

in which X and Y are each less than 4 and X+Y are at least 2. Other objects of the invention are to produce new compositions of matter suitable for dyeing, and new processes of applying them.

E. The objects of the invention are attained, generally speaking, by stabilizing a diazotized primary arylamine by forming a diazoimino compound stable in neutral or alkaline medium, by forming a printing composition therewith also containing a compound of the formula

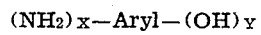

in which X and Y are each small integers, preferably 2, 1, or 0 and X+Y are at least 2, and by dyeing material therewith by printing. Other objects of the invention are attained by preparing the said mixtures as dry powders, as pastes, or in solution, and by incorporating them in printing pastes and other dyeing compositions. The objects of the invention are acccomplished, in one specific modification, by impregnating a fabric, or a fibrous material, with a basic or neutral paste containing a mixture of the stabilized azo component and the coupling component, and exposing the impregnated material, preferably at elevated temperature, to the action of a preferably mild acid. Still other objects of the invention are accomplished by the processes of applying the new compositions of matter more fully hereinafter set forth.

F. In the practice of the preferred form of the invention the azo component, a diazotized primary arylamine, is coupled with a stabilizing agent, for instance piperidine-alpha-carboxylic acid, forming a compound stable in alkaline or neutral medium, and is mixed with a coupling component of the type hereinabove described. The mixtures may be in the form of dry powders, in the form of pastes, or in the form of solutions and, although the processes of using them will differ somewhat according to the state of the ingredients, the general method will be to impregnate the colorable material with the mixture, and to act upon it with enough acid to regenerate the diazo component and permit it to react with the coupling component.

G. In the form of the invention which involves the dyeing of a cloth by the so-called process of printing, the azo component, diazotized and stabilized as hereinabove described, is mixed in a basic paste with the coupling component, the paste is applied to an etched or "printing" roller which impregnates the fabric by contact, the fabric is placed in a closed container, and is subjected for a few seconds, at elevated temperature and usually in the presence of water vapor, to the action of the fumes of an acid which neutralizes the basicity of the paste, breaks up the stabilized complex, and frees the azo component for reaction with the coupling component.

H. The azo components may advantageously include as substituents in the aryl nucleus from one to five of the group alkyl, alkoxy, halogen, aryloxy, aralkyl, aralkoxy, aryl, hydroaryloxy, and trifluoro-alkyl, but generally speaking satisfactory results are obtained by the use of azo components having from one to three of these substituents. Illustrative of the general utility as azo components of the primary arylamines are the following:

Ortho-chloro-aniline, 2:5-dichloro-aniline, 4-chloro-2-amino-phenetol, ortho anisidine, 4-chloro-2:5-dimethyl-aniline, 4-benzoyl-amino-2:5-dimethoxy-aniline, 5-nitro-2-amino-anisole, 1-methoxy-2-naphthylamine, 4-chloro-2-amino-diphenyl-ether, meta-amino-benzo-trifluoride, ortho-amino-azo-toluene, 4:4'-diamino-diphenylamine, and 3-amino-carbazole. This list is exemplary, not limitative.

I. The coupling components used in our invention may have the nuclear substituent groups recited in Paragraph H in numbers up to the limit of capacity, but those having no or a low number of substituents produce such excellent colors that it is usual to employ them. The following are exemplary, but not limitative, of the class of satisfactory coupling components:

2-amino-4-hydroxy-toluene, 4-amino-resorcinol, 2-hydroxy-4-amino-anisole, 3:5-diamino-phenol, 2:4-dihydroxy-1-naphthylamine, 4:8-dihydroxy-1-naphthylamine, 3-amino-6-hydroxy-carbazole, phloro-glucinol, 2:6-dihydroxy-naphthalene, 1:5-dihydroxy-anthracene, meta-tolylene-diamine, 1:5-diamino-naphthalene, and symmetrical triamino-benzene.

Similar amino and/or hydroxy derivatives of benzene, naphthalene, anthracene, diphenyl, phenanthrene, chrysene, and pyrene are also useful, and demonstrate that the scope of the invention, in its broadest form, includes the entire field of aryl hydroxy and/or amino compounds whose formulas correspond to that recited in Paragraph E hereof.

J. Any of the usual stabilizing agents may be used in the preparation of water-soluble diazo-imino compounds. The following are exemplary, but not limitative, of the class:

Sarcosin, 1-methyl-amino-ethane-2-sulfonic-acid, proline, nipecotinic-acid, benzylene-imine-para-sulfonic-acid, 1-naphthylamine-2:4:8-trisulfonic acid, and 2-ethyl-amino-4-sulfo-benzoic-acid.

Examples of other derivatives of diazotized arylamines which are inactive toward coupling components under alkaline conditions, but which revert to the diazo form when reacted upon by acids are, for instance, the so-called nitrosamines and azo-sulfonates.

K. The ratio of diazoimino components to coupling components in the mixtures may be varied widely. For example, in many instances the optimum results are obtained if the two components are mixed in equimolecular ratios; but even more frequently optimum results are obtained by using approximately two mols of the diazo to each mol. of the coupling component. It is within the scope of this invention to use the ingredients in each instance in those proportions which produce the most desirable results.

L. The following examples, in which parts are by weight, are designed to illustrate but not to limit the various features of the invention. The exact constitution of the colors has not been experimentally determined and is at present uncertain.

*Example I*

26 parts of resorcinol were ground with 74 parts of the diazoimino compound obtained by the action of diazotized 4-chloro-2-amino-anisole on piperidine-alpha-carboxylic acid, producing a light tan powder.

A printing paste was prepared according to the following formula:

| | Parts |
|---|---|
| Dry mixture obtained above | 6 |
| Ethylene-glycol-mono-ethyl-ether | 6 |
| Water | 21 |
| Sodium-hydroxide solution—(25% strength) | 2 |
| Starch-gum tragacanth thickener | 65 |

Cotton piece goods were printed with this paste from an engraved copper roll, dried, and subjected for a period of two minutes to the vapors from a boiling 5% acetic-acid solution. The developed prints were rinsed with water, soaped, again rinsed, and dried. The print developed to a brown shade.

*Example II*

13 parts of meta-amino-phenol were mixed with 87 parts of the water-soluble diazoimino compound prepared by reacting diazotized 4-chloro-2-amino-anisole with piperidine-alpha-carboxylic acid, 10 parts of sugar were ground to a fine powder, and a printing paste was prepared by a formula similar to that given in Example I. Cotton piece goods were printed with the paste and the color was developed as in Example I. The pattern developed as a reddish brown.

*Example III*

28 parts of pyrogallol were mixed with 72 parts of a water-soluble diazoimino compound obtained by the action of diazotized 4-chloro-2-amino-toluene on piperidine-alpha-carboxylic acid. A printing paste was prepared, and cotton piece goods were printed by the procedure described in Example I. The printed pattern developed as a tan shade.

*Example IV*

34 parts of 1:5-dihydroxy-naphthalene, and 66 parts of the water-soluble diazoimino compound prepared by the action of diazotized 4-chloro-2-amino-anisole on piperidine-alpha-carboxylic acid were ground together, and a printing paste containing the mixture was prepared, proportions being those of the formula of Example I. Cotton piece goods were printed with the paste, and the color was developed as described in Example I. The pattern developed as a brown shade.

Example V 40 parts of resorcinol were ground to fine powder with 60 parts of the water-soluble diazoimino compound obtained by the reaction of tetrazotized dianisidine with methyl-glucamine. A printing paste containing this mixture and other ingredients was prepared by the formula of Example I. Cotton piece goods were printed with the paste and the color developed by the action of acid. The pattern developed as a dark brown.

Example VI

A water-soluble diazoimino compound was obtained by reacting diazotized 4-chloro-2-aminotoluene with piperidine-alpha-carboxylic acid. 80 parts of this diazoimino compound were mixed with 20 parts of 1:7-amino-naphthol. A printing paste was prepared as in Example I and cotton piece goods were printed by the procedure described in Example I. The printed pattern was developed to a brown shade of good fastness. The exact constitution of the produced dyestuff not being known, no formula therefor is given, but the dyestuff is claimed as new.

Example VII

A water-soluble diazoimino compound was prepared by reacting diazotized 4-chloro-2-aminoanisole with piperidine-alpha-carboxylic acid. 75 parts were intimately mixed by grinding with 15 parts of 1:5-amino-naphthol and 10 parts of sugar. A printing paste was prepared as in Example I. Cotton goods were printed therewith and the color was developed as described above. It was a brown shade of good fastness. The exact constitution of the produced dyestuff not being known, no formula therefor is given, but the dyestuff is claimed as new.

The following table lists additional mixtures suitable for the printing of cotton and similar fibers by processes as illustrated in the above examples:

| Example No. | Parts | Diazoimino component | Parts | Coupling component | Shade produced |
|---|---|---|---|---|---|
| VIII | 90 | Water-soluble diazoimino component obtained by the action of diazotized 4-chloro-2-amino-anisole on methyl-glucamine. | 10 | Resorcinol | Brown |
| IX | 86 | Water-soluble diazoimino compound obtained by the action of diazotized aniline on methyl-glucamine. | 14 | Resorcinol | Reddish brown |
| X | 87 | Water-soluble diazoimino compound of Example IV. | 13 | Meta-amino-phenol | Brown |
| XI | 87 | Water-soluble diazoimino compound of Example IX. | 13 | Meta-amino-phenol | Brown |
| XII | 81 | Water-soluble diazoimino compound of Example I. | 19 | 2:4-diamino-phenol | Yellowish brown |
| XIII | 72 | Water-soluble diazoimino compound of Example I. | 28 | Pyrocatechol | Tan |
| XIV | 66 | Water-soluble diazoimino compound of Example I. | 34 | 2:7-dihydroxy-naphthalene. | Reddish brown |

M. The examples herein illustrate the compositions in the form of dry powders, but the compositions may be produced with equal facility in pastes or solutions containing water or other satisfactory solvent liquids. They may, for instance, be dissolved in solutions of water, or in water mixed with ethyl alcohol, Cellosolve, ethanolamine, and the like. These solutions must, of course, be neutral or alkaline until the time comes for coupling the two components of the dye.

N. The examples illustrate only the printing of textile fibers by these compositions. It will be understood, however, that any other method of impregnating the fibers may be used. For instance, the new compositions may be dissolved or suspended in a liquid medium, and pigments produced by treating with acids under suitable conditions of temperature and concentration.

O. The invention is applicable to the dyeing of cotton, regenerated cellulose, cellulose esters and ethers and, with somewhat less satisfactory results, to the dyeing of wool, silk, and leather.

P. This new class of compositions and the new process make possible the dyeing and printing of suitable materials in very dark brown and black shades by the recently developed one-bath process, for which heretofore no products were available. The new compositions are readily manufactured at a reasonable cost, and produce colors of satisfactory fastness.

Q. As many apparently widely different embodiments of this invention may be made without departing from the spirit and scope thereof, it is to be understood that we do not limit ourselves to the specific embodiments thereof except as defined in the appended claims.

We claim:

1. A textile material dyed with a color formed by coupling thereon a compound from the class consisting of $(NH_2)_x$—Aryl, $(HO)_y$—Aryl, $(NH_2)_x$—Aryl—$(OH)_y$, in which X and Y are each 1, 2 or 3, with a diazotized primary arylamine free from water-solubilizing groups.

2. The method which comprises impregnating a dyeable material with a non-acid mixture containing a diazoimino compound stable in non-acid mediums and one of the group of compounds consisting of $(NH_2)_x$—Aryl, $(HO)_y$—Aryl, $(NH_2)_x$—Aryl—$(OH)_y$, in which X and Y are each 1, 2 or 3.

3. The method which comprises impregnating a cellulosic material with a non-acid mixture containing a diazoimino compound stable in non-acid medium and one of the group of compounds consisting of $(NH_2)_x$—Aryl, $(HO)_y$—Aryl, $(NH_2x$—Aryl—$(OH)_y$, in which X and Y are each 1, 2, or 3.

4. A non-acid composition of matter comprising a diazoimino compound stable in non-acid medium and one of a group of compounds consisting of $(NH_2)_x$—Aryl, $(HO)_y$—Aryl, $(NH_2)_x$—Aryl—$(OH)_y$, in which X and Y are each 1, 2, or 3.

5. The method of dyeing which comprises printing cellulose with a composition comprising a mixture of about 6 parts of the composition formed by mixing 26 parts of resorcinol and 74 parts of the diazoimino compound formed by reacting diazotized 4-chloro-2-amino-anisole with piperidine-alpha-carboxylic acid, 6 parts of ethylene-glycol-mono-ethyl-ether, about 21 parts of water, about 2 parts of 25% sodium hydroxide aqueous solution and about 65 parts of starch-gum tragacanth thickener, and subjecting the impregnated cellulose to the fumes from boiling 5% acetic acid aqueous solution.

6. The method of dyeing which comprises printing a fabric with a mixture of resorcinol, 4-chloro-2-amino-anisole-piperidine-alpha-carboxylic acid, an organic solvent, water, sodium hydroxide, and a starch-gum tragacanth thickener, and subjecting the printed fabric to the action of acid fumes.

7. A composition of matter comprising 6 parts of a mixture of 26 parts resorcinol and 74 parts of the aryl diazoimino compound 4-chloro-2-amino-anisole-piperidine-alpha-carboxylic acid, 21 parts water, 2 parts 25% sodium hydroxide aqueous solution, and 65 parts starch-gum tragacanth thickener.

8. A composition of matter comprising 6 parts of a mixture of 26 parts resorcinol and 74 parts of the aryl diazoimino compound 4-chloro-2-amino-anisole-piperidine-alpha-carboxylic acid, an organic solvent, water, an alkali, and a thickener.

9. A printing paste comprising resorcinol and a diazoimino compound stable in non-acid medium.

10. A textile material dyed with a compound formed by coupling thereon resorcinol and diazotized 4-chloro-2-amino-anisole.

MILES AUGUSTINUS DAHLEN.
FRITHJOF ZWILGMEYER.

CERTIFICATE OF CORRECTION.

Patent No. 2,099,104. November 16, 1937.

MILES AUGUSTINUS DAHLEN, ET AL.

It is hereby certified that error appears in the printed specification of the above numbered patent requiring correction as follows: Page 1, second column, line 29, for "accompplished" read accomplished; page 3, second column, line 42, claim 3, for "$(NH_{2x}$" read $(NH_2)_x$ ; and that the said Letters Patent should be read with these corrections therein that the same may conform to the record of the case in the Patent Office.

Signed and sealed this 22nd day of February, A. D. 1938.

(Seal)

Henry Van Arsdale,
Acting Commissioner of Patents.